United States Patent [19]

Cornelius

[11] 3,736,014
[45] May 29, 1973

[54] PRESSURE ACTUATED RELEASE DEVICE

[75] Inventor: Kenneth T. Cornelius, Potomac, Md.

[73] Assignee: The United States of America as represented by the Secretary of the Navy, Washington, D.C.

[22] Filed: Nov. 18, 1971

[21] Appl. No.: 200,101

[52] U.S. Cl. ............. 292/256.5, 114/203, 287/111
[51] Int. Cl. .............................................. E05c 15/00
[58] Field of Search ................... 292/256.5, 256; 287/111; 85/33; 52/1; 114/203; 70/DIG. 48; 49/141

[56] References Cited

UNITED STATES PATENTS

| | | | |
|---|---|---|---|
| 2,882,781 | 4/1959 | Gates | 85/33 |
| 3,442,048 | 5/1969 | Elias | 49/141 |
| 3,453,777 | 7/1969 | Reilly | 49/141 |
| 3,537,421 | 11/1970 | Zannini | 287/111 X |
| 3,099,509 | 7/1963 | Duenke | 339/255 |

Primary Examiner—Robert L. Wolfe
Attorney—R. S. Sciascia, Q. E. Hodges and J. W. Peterson

[57] ABSTRACT

The invention is a device to hold shipboard hatches closed against the application of great mechanical force, yet release them when the ambient air pressure reaches a preselected value.

6 Claims, 2 Drawing Figures

Patented May 29, 1973

3,736,014

INVENTOR
KENNETH T. CORNELIUS

BY  O. D. Hodges
ATTORNEY

PRESSURE ACTUATED RELEASE DEVICE

The invention described herein may be manufactured and used by or for the Government of the United States of America for Governmental purposes without the payment of any royalties thereon or therefor.

BACKGROUND OF THE INVENTION

Missile-equipped ships are protected against damage from a sudden pressure build-up in the missile magazine, resulting from an inadvertent ignition of a stowed rocket engine, by controlling venting of the magazine. The vents, called "blow-out hatches", are forced open by the pressure generated forces, relieving the pressure and preventing the rupture of internal bulkheads. Normally, the blow-out hatches should be tightly closed, excluding weather and providing security for the contents of the magazine. The means presently used to control the action of the blow-out hatches is based on the inclusion of a weak link in the structure used to secure the hatches. Usually, this weak link is a necked-down bolt. This type of link is designed to fail as the pressure reaches a preselected value within the magazine and, as a result thereof, will release the hatch. The pressure is selected so that the internal bulkheads are not ruptured. When necked-down bolts are used, they are tensioned to perhaps 30 percent of their ultimate strength. Therefore, the force available to seal or secure the hatch is decreased. The present invention provides a means to secure the hatches with great mechanical force yet release them independently of the securing force when the ambient air pressure reaches a preselected value.

SUMMARY OF THE INVENTION

The invention is a device for securing shipboard hatches which is capable of withstanding great tensile forces yet is readily releasable when the device is subjected to a predetermined ambient air pressure.

OBJECTS OF THE INVENTION

It is a principle object of this invention to provide a pressure actuated hatch release device capable of securing hatches against the application of great mechanical force yet capable of releasing them when the ambient air pressure reaches a preselected value.

It is a further object of the invention to provide a device that is insensitive to temperature below the high temperatures that would affect the physical properties of the device.

It is yet another object of the instant invention to provide a shipboard hatch release that does not utilize electrical or explosive gadgetry.

DESCRIPTION OF THE PREFERRED EMBODIMENT

Figure 1:
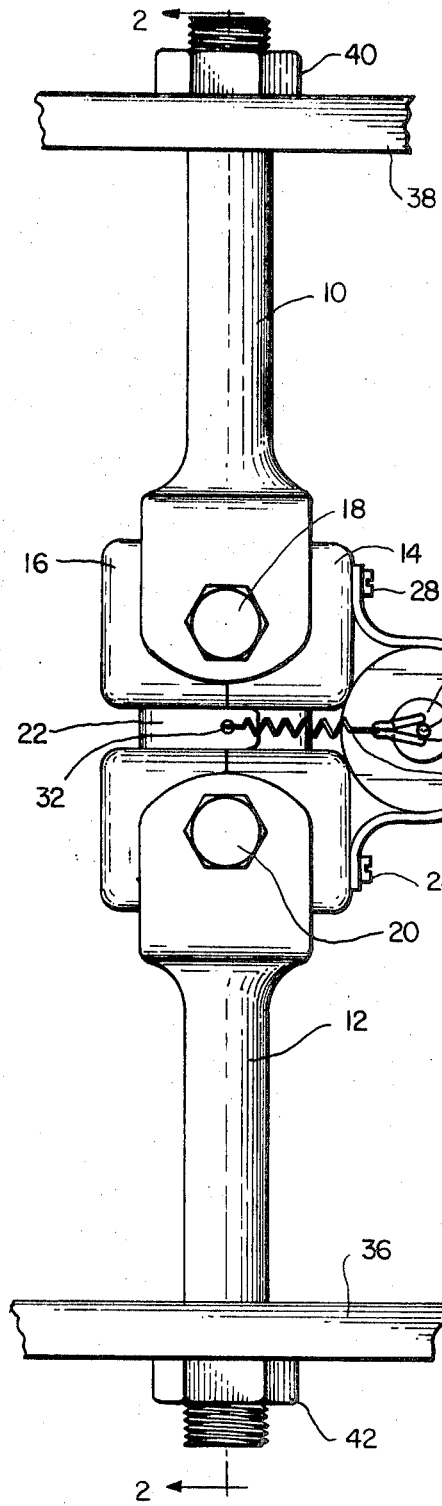
FIG. 1 shows a side view of the securing device.
Figure 2:
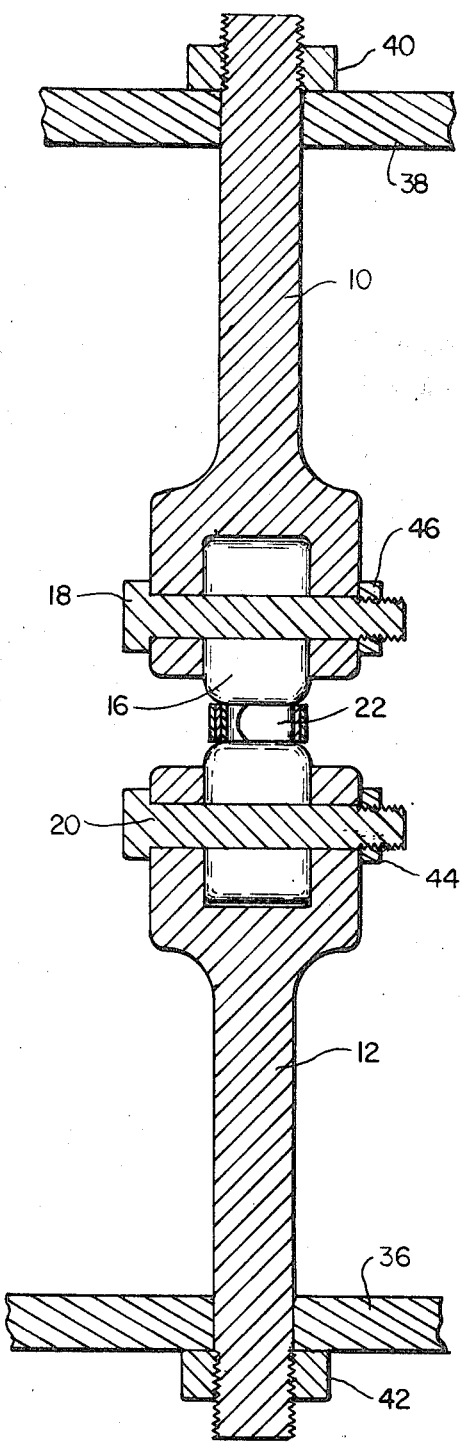
FIG. 2 is a section view along section lines 2—2 of FIG. 1.

With continued reference to the drawings, FIG. 1 shows the assembled pressure actuated release device securing hatch 38 to deck-plate 36. The device comprises two tension members 10 and 12 secured to the hatch 38 and deck-plate 36 respectively by nuts 40 and 42. Cross bolts 18 and 20 extend through tension members 10 and 12 and are secured by nuts 46 and 44, respectively. The two cross bolts 18 and 20 are secured with respect to each other by jaw members 14 and 16. The jaw members 14 and 16 are clamped together by draw-up band 22. One end of draw-up band 22, as seen in FIG. 2, is inserted in a groove between the jaws 14 and 16 initially and is wrapped under tension several times around the necked portion of the jaws 14 and 16. Hole 32 is punched in the other end of the draw-up band 22 as seen in FIG. 1. Draw-up band 22 is secured at hole 32 to separable tongs 34 of the pressure release mechanism 24 by tension member 30. The pressure release mechanism 24 is secured to jaw 14 by clamp band 26 and attaching means 28. The pressure release mechanism is designed to be unaffected by temperatures of up to 700° Farenheit. The mechanism, for example, may be based on a phospher-bronze bellows, from which all the air has been evacuated. Spacer pin 35 is attached to one end of the bellows. The atmospheric pressure is counterbalanced by an Inconel compression spring within the bellows. The bellows and the compression spring are then installed in a housing and compressed slightly so that no further compression occurs until ambient pressure exceeds a predetermined amount. When the predetermined pressure is exceeded the bellows will collapse. Spacer pin 35 will move the bellows thereby allowing separable tongs 34 to separate and release tension member 30. Clamp band 26 will then unwrap allowing jaws 14 and 16 to separate. It would be within the scope of the present invention to use other pressure sensitive trip mechanisms.

It is understood that the invention is not limited to the exact details of construction shown and described for obvious modifications will occur to persons skilled in the art. It is therefore to be understood that within the scope of the appended claims the invention may be practiced otherwise than as specifically described.

What is claimed is:
1. A pressure actuated release link for securing first and second members together, which comprises:
    a first clevis means secured to said first member;
    a second clevis means secured to said second member;
    a split link securing said first and said second clevis means together; and
    a barometrically responsive retaining means to maintain said split link in integral condition and to allow said split link to separate at a preselected ambient pressure, thereby freeing said first and second clevis members.
2. A device as in claim 1 wherein said barometrically responsive retaining means comprises:
    band means wrapped at least once around said split link to retain said split link in integral condition; and
    a barometrically responsive release means connected to said band means.
3. A device as in claim 2 wherein:
    said split link has a detent on the exterior surface of each link to retain said band means.
4. A device as in claim 2 wherein:
    said band means is clamped at one end between said pieces of said split link and connected at the other end thereof to said barometrically responsive release means.
5. A device as in claim 4 wherein said barometrically responsive means further comprises:

separable tongs which in their closed condition grip the other end of the band means;

a spacer means to maintain said separating tongs in their closed condition; and pressure collapsible means connected to said spacer means so that when a preselected ambient pressure is reached the pressure collapsible means will collapse moving the spacer means and allowing the separable tongs to open thereby releasing the band means and freeing the first and second members.

6. A device as in claim 5 wherein:

said pressure collapsible means is an evacuated bellows and a compression spring within said bellows.

* * * * *